Jan. 29, 1957   J. D. DURHAM ET AL   2,779,115
TICKET HOLDER
Filed Oct. 21, 1953

James Darrel Durham
Henry Otte
Donald B. Neal
INVENTORS.

BY *Clarence A. O'Brien*
*and Harvey B. Jackson*
Attorneys

2,779,115
Patented Jan. 29, 1957

2,779,115
TICKET HOLDER

James Darrel Durham, Dearborn, Henry Otte, Detroit, and Donald B. Neal, Inkster, Mich.

Application October 21, 1953, Serial No. 387,472

6 Claims. (Cl. 40—17)

This invention relates to a ticket holder adapted to be attached to the back of a seat so as to provide positive indication of the right of occupancy of that seat by a particular patron.

At race tracks and other similar establishments, spectators watching the sporting events customarily leave their seats at frequent intervals. Inasmuch as race tracks and the like are very large establishments many of the patrons thereof become confused as to the precise location of their reserved seat. Many solutions to this problem have been tried, the most prevalent being the numbering of the seats according to the rows thereof. However, this is somewhat inadequate inasmuch as the patron often has a great deal of difficulty recognizing the proper seat in the proper row as being the one which he was shown to by an usher. Therefore, it is the primary object of this invention to provide means whereby a spectator may positively identify a particular seat as his reserved seat.

The construction of this invention features a ticket holder adapted to have inserted therein a portion of a ticket having indicia thereon indicating by its correspondence with another portion of the ticket retained by the patron that the patron is entitled to the use of that reserved seat at the given date. Means are provided for lockingly holding the portion of the ticket in position after it has been inserted thereby preventing tampering with these ticket holders.

Still further objects and features of the invention reside in the provision of a ticket holder that is strong and durable, simple in construction and attachment to existing seats at race tracks and like establishments, which is attractive in appearance inexpensive to produce and which has space thereon for suitable advertising indicia.

These, together with the various ancillary objects and features of the invention which will become apparent as the following description proceeds, are obtained by this ticket holder, a preferred embodiment of which has been illustrated in the accompanying drawings, by way of example only, wherein.

Figure 1:
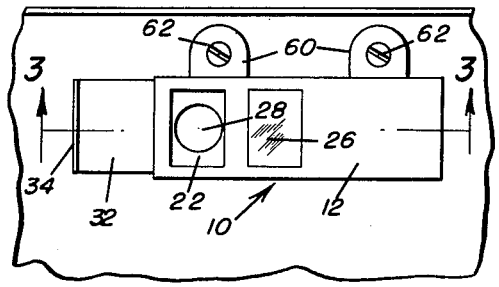
Figure 1 is an elevational view showing the ticket holder as attached to the back of a seat and in position ready for reception of a portion of a ticket.
Figure 2:
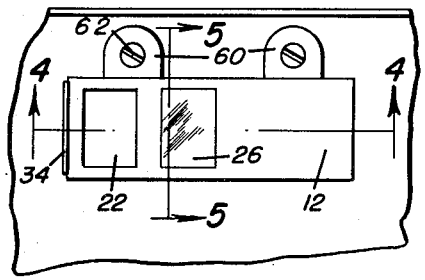
Figure 2 is another elevational view illustrating the construction of the invention and showing the ticket as inserted in the ticket holder.

With continuing reference to the accompanying drawings wherein like reference numerals designate similar parts throughout the various views, reference numeral 10 generally designates the ticket holder comprising the present invention. The ticket holder 10 includes a casing 12 having spaced upper and lower plates 14 and 16, the upper plate 14 having integrally formed therewith substantially L-shaped side flanges 18 and 20 which extend downwardly therefrom and which are adapted to be secured to the lower plate 16 in embracing relationship therewith. The upper plate 14 is provided with a pair of windows or apertures 22 and 24, the window or aperture 24 being closed by means of a transparent panel 26 of suitable material such as glass or synthetic plastic resin, cellulose acetate, or the like. The lower plate 16 is provided with an aperture 28 therethrough in alignment with the window 22 and adapted to permit insertion of a finger so that a ticket inserted in the ticket receiving aperture 30 in an intermediate plate 32 may be readily removed therefrom.

Figure 3:
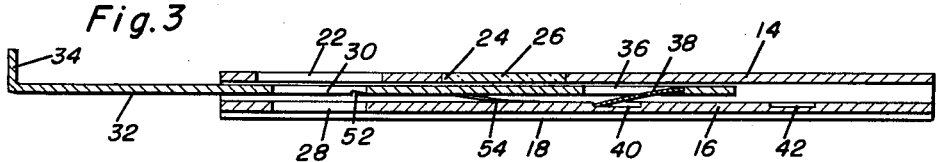
Figure 3 is an enlarged horizontal sectional view as taken along the plane of line 3—3 of Figure 1.
Figure 4:
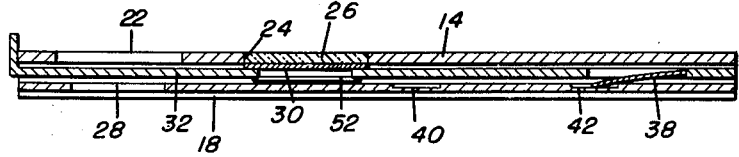
Figure 4 is an enlarged sectional detailed view illustrating the construction of the various elements of this invention as taken along the plane of line 4—4 in Figure 2.
Figure 5:
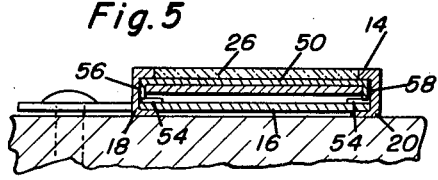
Figure 5 is a sectional detail view as taken along the plane of line 5—5 in Figure 2.
Figure 6:
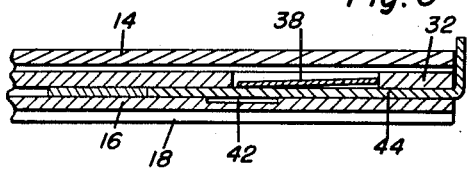
Figure 6 is an enlarged sectional detail view illustrating the manner in which the key is used for opening this ticket holder.
Figure 7:
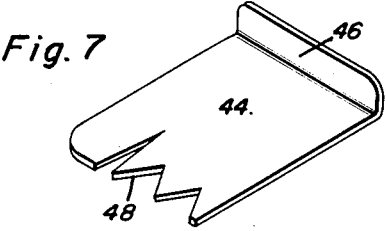
Figure 7 is a perspective view illustrating one of the keys utilized in opening this ticket holder.

The intermediate plate 32 is provided with a handhold 34 which extends at right angles to the plate 32 and upwardly therefrom. The hand-hold 34 provides a limit stop which limits the extent of insertion of the intermediate plate 32 into the casing 12. The intermediate plate 32 is provided with a further aperture 36 therethrough. Within the aperture 36 is seated on end of a spring 38 the other and free end of the spring 38 because of the characteristics and construction thereof extending downwardly and resiliently engaging the lower plate 16. The lower plate 16 is provided with a pair of recesses 40 and 42 therein. The spring 38 is adapted to to engage the lower plate 16 within either of the recesses 40 and 42. When the spring engages the lower plate 16 within the recess 40, the ticket receiving recess 30 is in alignment with the apertures 22 and 28. Then, a ticket can be inserted in the aperture 30 and the intermediate plate 32 pressed inwardly. However, if the intermediate plate 32 is pressed inwardly to the position as is shown in Figure 4, the intermediate plate cannot then be withdrawn to an open position unless the key indicated at 44 is inserted between the intermediate plate 32 and the lower plate 16. The key 44 is provided with a grip portion 46 and has a serrated inner edge 48 having the function of providing means to indicate to the patron that a particular type of key is necessary to be inserted in each of the casings 12, the device working satisfactorily even if the notches in the edge 48 were to be eliminated. When the key 44 is inserted the spring 38 is lifted out of engagement with the recess 42. This will then permit the intermediate plate 32 to be withdrawn to an open position as shown in Figure 3. Passing a finger through the aperture 28 the ticket which is preferably of the shape as best seen in Figure 5 and indicated by reference numeral 50 can then be withdrawn. It will then be impossible to close the ticket holder due to the fact that the intermediate plate 32 is notched on either side of the aperture 30 as is indicated at 52. There are attached to the lower plate 16 resilient elements or springs 54 which are adapted to engage plate 32 within the notches 52 when the intermediate plate 32 is pressed inwardly without the key being inserted therein. However, with the ticket 50 in place the downwardly extending flanges 56 and 58 of the ticket will depress the springs 54 thereby preventing them from engaging the intermediate plate 32 within the notches 52. Thus, there is provided adequate means for preventing fraudulent insertion of the bogus ticket. Further, it will be impossible to close the ticket holder without a ticket being inserted therein thereby eliminating the necessity for an usher to utilize his key in the insertion of the ticket of a patron.

As can be readily understood suitable tabs such as indicated at 60 are attached to the casing 12 and may be utilized in combination with screws 62 or other suitable fasteners in the attachment of the casing 12 to the back of a seat or other suitable place.

Since from the foregoing the construction and advantages of this ticket holder are readily apparent, further description is believed to be unnecessary.

However, since numerous modifications will readily occur to those skilled in the art after a consideration of the foregoing specification and accompanying drawing, it is not intended to limit the invention to the precise embodiment shown and described but all suitable modifications and equivalents may be readily resorted to.

What is claimed as new is as follows:

1. A ticket holder comprising a casing including spaced upper and lower plates, said upper plate having a first aperture and a second aperture therethrough, an intermediate plate slidably received between said upper and lower plates, a ticket receiving aperture in said intermediate plate adapted to be positioned successively in alignment with said apertures in said upper plate, a spring secured to said intermediate plate, at least one recess in said lower plate, said spring being adapted to seat in said recess to prevent said aperture in said intermediate plate from being positioned in alignment with said second aperture, said intermediate plate and said lower plate being adapted to receive a key therebetween for lifting said spring out of engagement within said recess.

2. A ticket holder comprising a casing including spaced upper and lower plates, said upper plate having a first aperture and a second aperture therethrough, an intermediate plate slidably received between said upper and lower plates, a ticket receiving aperture in said intermediate plate adapted to be positioned successively in alignment with said apertures in said upper plate, a spring secured to said intermediate plate, at least one recess in said lower plate, said spring being adapted to seat in said recess to prevent said aperture in said intermediate plate from being positioned in alignment with said second aperture, said intermediate plate and said lower plate being adapted to receive a key therebetween for lifting said spring out of engagement within said recess, and a finger hole through said lower plate in alignment with said first aperture.

3. A ticket holder comprising a casing including spaced upper and lower plates, said upper plate having a first aperture and a second aperture therethrough, an intermediate plate slidably received between said upper and lower plates, a ticket receiving aperture in said intermediate plate adapted to be positioned successively in alignment with said apertures in said upper plate, a spring secured to said intermediate plate, a pair of spaced recesses in said lower plate, said spring being adapted to seat in a first of said recesses to prevent said aperture in said intermediate plate from being positioned in alignment with said second aperture, said intermediate plate and said lower plate being adapted to receive a key therebetween for lifting said spring out of engagement with said first recess, said spring being engageable with said second recess to prevent complete withdrawal of said intermediate plate when a key is inserted between said intermediate plate and said lower plate.

4. A ticket holder comprising a casing including spaced upper and lower plates, said upper plate having a first aperture and a second aperture therethrough, an intermediate plate slidably received between said upper and lower plates, a ticket receiving aperture in said intermediate plate adapted to be positioned successively in alignment with said apertures in said upper plate, a spring secured to said intermediate plate, at least one recess in said lower plate, said spring being adapted to seat in said recess to prevent said aperture in said intermediate plate from being positioned in alignment with said second aperture, said intermediate plate and said lower plate being adapted to receive a key therebetween for lifting said spring out of engagement within said recess, said intermediate plate having at least one notch therein immediately adjacent said ticket receiving aperture, at least one resilient element attached to said lower plate adapted to seat in said notch to selectively prevent said ticket receiving aperture from being positioned in alignment with said second aperture, said resilient element being depressed out of engagement within said notch by a ticket being inserted in said ticket receiving aperture.

5. A ticket holder comprising a casing including spaced upper and lower plates, said upper plate having a first aperture and a second aperture therethrough, an intermediate plate slidably received between said upper and lower plates, a ticket receiving aperture in said intermediate plate adapted to be positioned successively in alignment with said apertures in said upper plate, a spring secured to said intermediate plate, a pair of spaced recesses in said lower plate, said spring being adapted to seat in a first of said recesses to prevent said aperture in said intermediate plate from being positioned in alignment with said second aperture, said intermediate plate and said lower plate being adapted to receive a key therebetween for lifting said spring out of engagement with said first recess, said spring being engageable with said second recess to prevent complete withdrawal of said intermediate plate when a key is inserted between said intermediate plate and said lower plate, said intermediate plate having at least one notch therein immediately adjacent said ticket receiving aperture, at least one resilient element attached to said lower plate adapted to seat in said notch to selectively prevent said ticket receiving aperture from being positioned in alignment with said second aperture, said resilient element being depressed out of engagement within said notch by a ticket being inserted in said ticket receiving aperture.

6. A ticket holder comprising a casing including spaced upper and lower plates, said upper plate having a first aperture and a second aperture therethrough, an intermediate plate slidably received between said upper and lower plates, a ticket receiving aperture in said intermediate plate adapted to be positioned successively in alignment with said apertures in said upper plate, a spring secured to said intermediate plate, a pair of spaced recesses in said lower plate, said spring being adapted to seat in a first of said recesses to prevent said aperture in said intermediate plate from being positioned in alignment with said second aperture, a key receivable between said intermediate plate and said lower plate for lifting said spring out of engagement with said first recess, said spring being engageable with said second recess to prevent complete withdrawal of said intermediate plate when said key is inserted between said intermediate plate and said lower plate, said intermediate plate having at least one notch therein immediately adjacent said ticket receiving aperture, at least one resilient element attached to said lower plate adapted to seat in said notch to selectively prevent said ticket receiving aperture from being positioned in alignment with said second aperture, said resilient element being depressed out of engagement within said notch by a ticket being inserted in said ticket receiving aperture, a transparent covering for said second aperture and a finger hole through said lower plate in alignment with said first aperture.

References Cited in the file of this patent
UNITED STATES PATENTS

| | | |
|---|---|---|
| 398,392 | Harker | Feb. 26, 1889 |
| 1,159,164 | Brand | Nov. 2, 1915 |
| 1,826,671 | Ohnstrand | Oct. 6, 1931 |
| 2,625,759 | Koepke | Jan. 20, 1953 |